(12) United States Patent
Schwartz (10) Patent No.: US 12,324,375 B1
(45) Date of Patent: Jun. 10, 2025

(54) WIDTH ADJUSTABLE HARVESTING APPARATUS AND MACHINE

(71) Applicant: Abe Schwartz, Eckerty, IN (US)

(72) Inventor: Abe Schwartz, Eckerty, IN (US)

(*) Notice: Subject to any disclaimer, the term of this patent is extended or adjusted under 35 U.S.C. 154(b) by 703 days.

(21) Appl. No.: 17/529,478

(22) Filed: Nov. 18, 2021

Related U.S. Application Data (60) Provisional application No. 63/115,311, filed on Nov. 18, 2020.

(51) Int. Cl.
| | | |
|---|---|---|
| *A01D 46/24* | (2006.01) | |
| *A01B 51/02* | (2006.01) | |
| *A01B 75/00* | (2006.01) | |
| *B62D 21/14* | (2006.01) | |

(52) U.S. Cl.
CPC .......... *A01D 46/243* (2013.01); *A01B 51/023* (2013.01); *A01B 75/00* (2013.01); *B62D 21/14* (2013.01)

(58) Field of Classification Search
CPC .... A01D 46/243; A01B 51/023; A01B 75/00; B62D 21/14
See application file for complete search history.

(56) References Cited

U.S. PATENT DOCUMENTS

| | | | |
|---|---|---|---|
| 238,223 A | 3/1881 | Fogg | |
| 1,115,565 A * | 11/1914 | Phillips | A01D 34/6806 56/113 |
| 1,195,578 A * | 8/1916 | Goossen | A01D 57/20 56/192 |
| 1,756,803 A | 4/1930 | Williams | |
| 2,317,606 A | 4/1943 | Harris | |
| 2,410,861 A * | 11/1946 | Bell | A01D 31/00 172/313 |
| 2,438,598 A * | 3/1948 | Bell | A01D 31/00 172/182 |
| 2,508,605 A * | 5/1950 | Hagie | A01D 47/00 180/253 |
| 2,796,155 A | 6/1957 | Cabler | |
| 2,818,266 A | 12/1957 | Cabler | |
| 3,037,570 A | 6/1962 | Olson | |

(Continued)

FOREIGN PATENT DOCUMENTS

| | | | | |
|---|---|---|---|---|
| CN | 106508284 A | * | 3/2017 | .......... A01D 46/243 |
| CN | 107711067 A | * | 2/2018 | ............. A01D 46/22 |

(Continued)

*Primary Examiner* — Arpad Fabian-Kovacs
(74) *Attorney, Agent, or Firm* — John Rizvi; John Rizvi, P.A.—The Patent Professor®

(57) ABSTRACT

A harvesting apparatus and machine is provided for permitting a pair of pickers to pick ground growing fruit from a comfortable and moving position. The harvesting machine includes a frame separated into a first frame half, and a second frame half horizontally adjustable relative to the first frame half. A first seat is positioned on the first frame half and a second seat is positioned on the second frame half, the distance between the first and second seats being adjustable by adjusting the position of the first frame half relative to the second frame half. A propulsion system, including a plurality of wheels, is provided to move the harvesting machine down a row of ground-growing fruit. A steering system is provided to control the direction of movement of the harvesting machine.

17 Claims, 8 Drawing Sheets

(56) References Cited

U.S. PATENT DOCUMENTS

| | | | |
|---|---|---|---|
| 3,041,082 A * | 6/1962 | Burkdoll | A01D 67/00 |
| | | | 280/656 |
| 3,127,036 A | 3/1964 | Cunningham et al. | |
| 3,172,679 A | 3/1965 | Bandini | |
| 3,351,151 A | 11/1967 | Miller, Jr. et al. | |
| 3,614,120 A | 10/1971 | Cicero | |
| 3,664,526 A * | 5/1972 | Dilday | A01D 45/16 |
| | | | 414/508 |
| 3,825,087 A * | 7/1974 | Wilson | A01B 51/023 |
| | | | 180/242 |
| 3,910,368 A | 10/1975 | Weber et al. | |
| 4,073,392 A * | 2/1978 | Dibler, deceased | |
| | | | A01D 46/243 |
| | | | 414/508 |
| 4,234,203 A | 11/1980 | Johnson | |
| 4,616,468 A * | 10/1986 | Munoz | A01D 67/00 |
| | | | 53/391 |
| 4,803,830 A * | 2/1989 | Junge | A01D 46/081 |
| | | | 56/28 |
| 4,875,330 A * | 10/1989 | Deutsch | A01D 46/08 |
| | | | 56/28 |
| 5,454,444 A | 10/1995 | Taylor et al. | |
| 5,473,874 A | 12/1995 | Nilsen | |
| 5,782,072 A * | 7/1998 | Matthews | A01D 41/1278 |
| | | | 56/28 |
| 5,897,122 A | 4/1999 | Borner | |
| 7,114,742 B1 | 10/2006 | Sterns | |
| 8,028,506 B1 * | 10/2011 | Casper | A01D 46/081 |
| | | | 172/6 |
| 8,635,845 B1 * | 1/2014 | Palm | A01D 46/00 |
| | | | 56/330 |
| 8,689,527 B2 | 4/2014 | Johnson et al. | |
| 8,991,140 B2 | 3/2015 | Dorn et al. | |
| 10,212,875 B2 | 2/2019 | Lacrouts-Cazenave et al. | |
| D862,526 S | 10/2019 | Blue, Jr. | |
| 2011/0088363 A1 * | 4/2011 | Johnson | B65B 25/04 |
| | | | 56/327.1 |
| 2011/0099965 A1 * | 5/2011 | Dorn | A01B 75/00 |
| | | | 414/813 |
| 2019/0261565 A1 | 8/2019 | Robertson et al. | |

FOREIGN PATENT DOCUMENTS

| | | | |
|---|---|---|---|
| CN | 108617265 A * | 10/2018 | A01D 46/22 |
| CN | 208242253 U * | 12/2018 | A01D 46/22 |
| EP | 0028673 | 5/1981 | |
| EP | 1159864 | 12/2001 | |
| EP | 3622791 | 3/2020 | |
| FR | 2247148 A * | 6/1975 | A01B 75/00 |
| FR | 2550049 A1 * | 2/1985 | A01D 45/001 |
| GB | 1575066 A * | 9/1980 | A01B 75/00 |
| KR | 20030082026 A * | 10/2003 | A01D 90/02 |
| KR | 200337839 Y1 * | 1/2004 | A01D 13/00 |
| KR | 20120124812 | 11/2012 | |
| KR | 101224248 | 1/2013 | |
| KR | 101324217 B1 * | 11/2013 | A01D 67/04 |
| KR | 101622948 B1 * | 5/2016 | A01D 67/04 |
| KR | 20170055027 | 5/2017 | |
| KR | 20200077346 A * | 6/2020 | A01D 67/04 |
| KR | 20200134946 A * | 12/2020 | A01D 67/04 |
| KR | 102439036 B1 * | 9/2022 | A01D 13/00 |
| RU | 2523500 | 7/2014 | |

* cited by examiner

WIDTH ADJUSTABLE HARVESTING APPARATUS AND MACHINE

CROSS-REFERENCE TO RELATED APPLICATIONS

This application claims the benefit of U.S. Provisional Patent Application No. 63/115,311 filed on Nov. 18, 2020, which is incorporated by reference herein in its entirety.

FIELD OF THE INVENTION

The present invention relates generally to devices for picking ground growing produce, and more particularly, to a seated harvesting apparatus and machine for picking ground-growing produce, for example, picking strawberries from a row of strawberries.

BACKGROUND OF THE INVENTION

Many types of produce, including fruits and vegetables, are planted for both personal and commercial use. The produce is often planted in long rows to facilitate harvesting.

Due to the delicate nature of some produce, the produce must be picked by hand to avoid damage not only to the produce harvested, but also to the produce still growing and ripening. Additionally, most produce needs to be picked by hand in order to harvest only that produce which has attained a sufficient degree of ripeness, and to leave the unripe produce to continue to grow and ripen.

Some produce grow on bushes or artificial trellises or cages, placing the produce at a convenient height for hand harvesting. Other produce, however, grow much closer to ground level, making such produce more difficult to harvest by hand. The pickers typically have to constantly bend over to reach the ground growing produce, or get down on their hands and knees to properly pick the produce.

Constant bending over and kneeling on the ground to reach the produce causes significant stresses to be placed on the body. Back muscle strains and arm and knee injuries are common during this type of close to ground hand picking of produce. Neck strains also occur as the picker is constantly bent over leading to neck complications and headaches.

Such physical problems are exacerbated as the pickers may have to go over hundreds of yards of rows of ground-growing fruit. Significant fatigue may occur as a result and make the above-mentioned problems even worse.

Existing farm machines are not configured to enable a picker to harvest produce close to the ground by hand. Maneuverability remains a problem, as existing farm vehicles are not able to be easily turned to harvest produce in another row or field area.

Manually powered vehicles are impractical, as they require significant physical work of the picker to convey them, causing even more strain and potential injury.

Moreover, motorized farm vehicles remain quite expensive.

Existing farm machines are not configured to accommodate more than one picker, or to enable more than one picker to harvest produce close to the ground while riding.

Existing farm machines are not configured to enhance the health and safety of pickers in other ways, such as protection from precipitation and ultraviolet radiation while enabling pickers to harvest ground-growing produce.

Accordingly, there is need for a solution to at least one of the aforementioned problems. For instance, there is an established need for an apparatus to allow a picker to pick ground growing produce from a seated rather than bent over position. There is a further established need for a self-propelled apparatus for carrying one or more picker along a row of produce and close to ground level.

SUMMARY OF THE INVENTION

The present invention is directed to a seated strawberry harvesting machine for permitting a pair of pickers to pick ground growing fruit, such as, for example, strawberries from a comfortable and moving position. The harvesting machine includes a frame separated into a first frame half and a second frame half horizontally adjustable relative to the first frame half. A first seat is positioned on the first frame half and a second seat is positioned on the second frame half, the distance between the first and second seats being adjustable by adjusting the position of the first frame half relative to the second frame half. A propulsion system, including a plurality of wheels, is provided to move the harvesting machine down a row of ground growing produce and a steering system is provided to control the direction of movement of the harvesting machine.

In an exemplary implementation of the invention, an adjustable, seated harvesting machine for use in picking a row of ground growing produce is provided, the harvesting machine comprising:
  a frame having a first frame half and a second frame half mounted for horizontal movement relative to said first frame half;
  a first seat mounted to said first frame half and a second seat mounted to said second frame half, said first and second seats being separated by a first distance;
  a propulsion system affixed to said frame and including a plurality of wheels; and
  a steering mechanism connected to said frame and associated with said plurality of wheels for turning the frame relative to the ground, wherein the first frame half is horizontally movable relative to the second frame half to adjust the first distance between said first and second seats.

In a second aspect, the first frame is a left-side frame half and the second frame half is a right-side frame half.

In another aspect, the left-side frame half includes a lower left longitudinal member and the first seat is mounted to the lower left longitudinal member.

In another aspect, the first seat is a left-side seat and is mounted to the lower left longitudinal member by a bracket.

In another aspect, the right-side frame half includes a lower right longitudinal member and the second seat is mounted to the lower right longitudinal member.

In another aspect, the left-side frame half includes a front left lower cross-member extending perpendicularly from the lower left longitudinal member.

In another aspect, the right-side frame half includes a front right lower cross-member extending perpendicularly from the lower right longitudinal member, wherein the front right lower cross-member is in adjustable engagement with the front left lower cross-member.

In another aspect, the left-side frame half includes front left vertical member extending upwardly from the lower left longitudinal member, a rear left vertical member extending upwardly from the lower left longitudinal member and an upper left longitudinal member extending between the front left vertical member and the rear left vertical member.

In another aspect, the right-side frame half includes front right vertical member extending upwardly from the lower right longitudinal member, a rear right vertical member extending upwardly from the lower right longitudinal member and an upper right longitudinal member extending between the front right vertical member and the rear right vertical member.

In another aspect, the left-side frame half includes a rear left upper cross-member extending perpendicularly from the rear left vertical member and the right-side frame includes a rear right upper cross-member extending perpendicularly from the rear right vertical member, wherein the rear left upper cross-member is in adjustable engagement with the rear right upper cross-member.

In another aspect, the left-side frame half includes a front left upper cross-member extending perpendicularly from the front left vertical member and the right-side frame half includes a front right upper cross-member extending perpendicularly from the front right vertical member, wherein the front left upper cross-member is in adjustable engagement with the front right upper cross-member.

In another aspect, the plurality of wheels includes a pair of drive wheels rotatably connected to the frame.

In another aspect, the pair of drive wheels includes a left-side drive wheel rotatably connected to the lower left longitudinal member of the left-side frame half and the a right side drive wheel rotatably connected to the lower right longitudinal member of the right-side frame half.

In another aspect, the propulsion system includes a motor connected to at least one of the left-side drive wheel and right-side drive wheel.

In another aspect, the left-side drive wheel is mounted on a drive shaft rotatably supported on the left-side frame.

In another aspect, the propulsion system further includes a rotatable shaft extending from the motor and a pulley mounted on the rotatable shaft.

In another aspect, a drive belt connects the pulley to the left-side drive wheel such that rotation of the motor rotates the left-side drive wheel.

In another aspect, the propulsion system includes a motor control connected to the motor.

In another aspect, the propulsion system includes a pair of guide wheels including a left-side guide wheel and a right-side and a right-side guide wheel, the left-side guide wheel and the right-side guide wheel being rotatably mounted on the frame.

In another aspect, the left-side guide wheel is mounted for angular movement relative to the lower left longitudinal member and the right-side guide wheel is mounted for angular movement relative to the lower right longitudinal member.

In another aspect, the steering system includes a steering handle connected to the left-side guide wheel and the right-side guide wheel.

In another aspect, the steering system further includes a rotatable turning wheel connected to the steering handle, and a left-side connecting arm extending between the rotatable turning wheel and the left-side guide wheel.

In another aspect, the steering system further includes a right-side connecting arm extending between the rotatable turning wheel and the right-side guide wheel.

In another aspect, the harvesting machine further includes a tray connected to the frame.

In another aspect, the harvesting machine further includes a windshield connected to the frame.

In another aspect, the harvesting machine further includes a roof connected to the frame and covering the first and second seats.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a self-propelled, seated strawberry harvesting machine that is adjustable in width to accommodate rows of strawberries of differing row spacing and allow pickers seated in the harvesting machine to pick strawberries from a row of strawberries passing between them.

Figure 1:
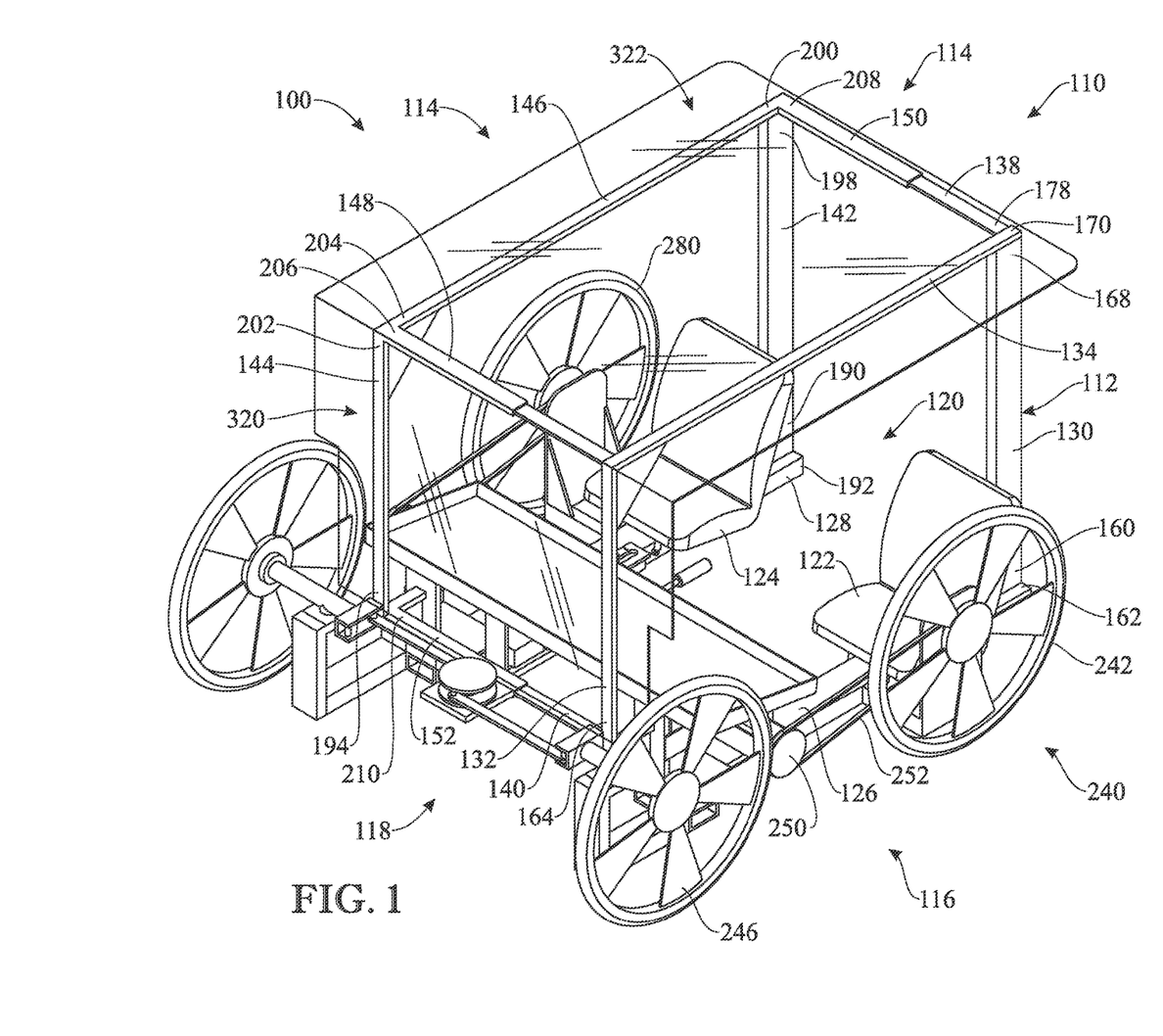
FIG. 1 presents a top front isometric view of a seated strawberry harvesting machine in accordance with an exemplary illustrative embodiment of the present invention.
Figure 2:
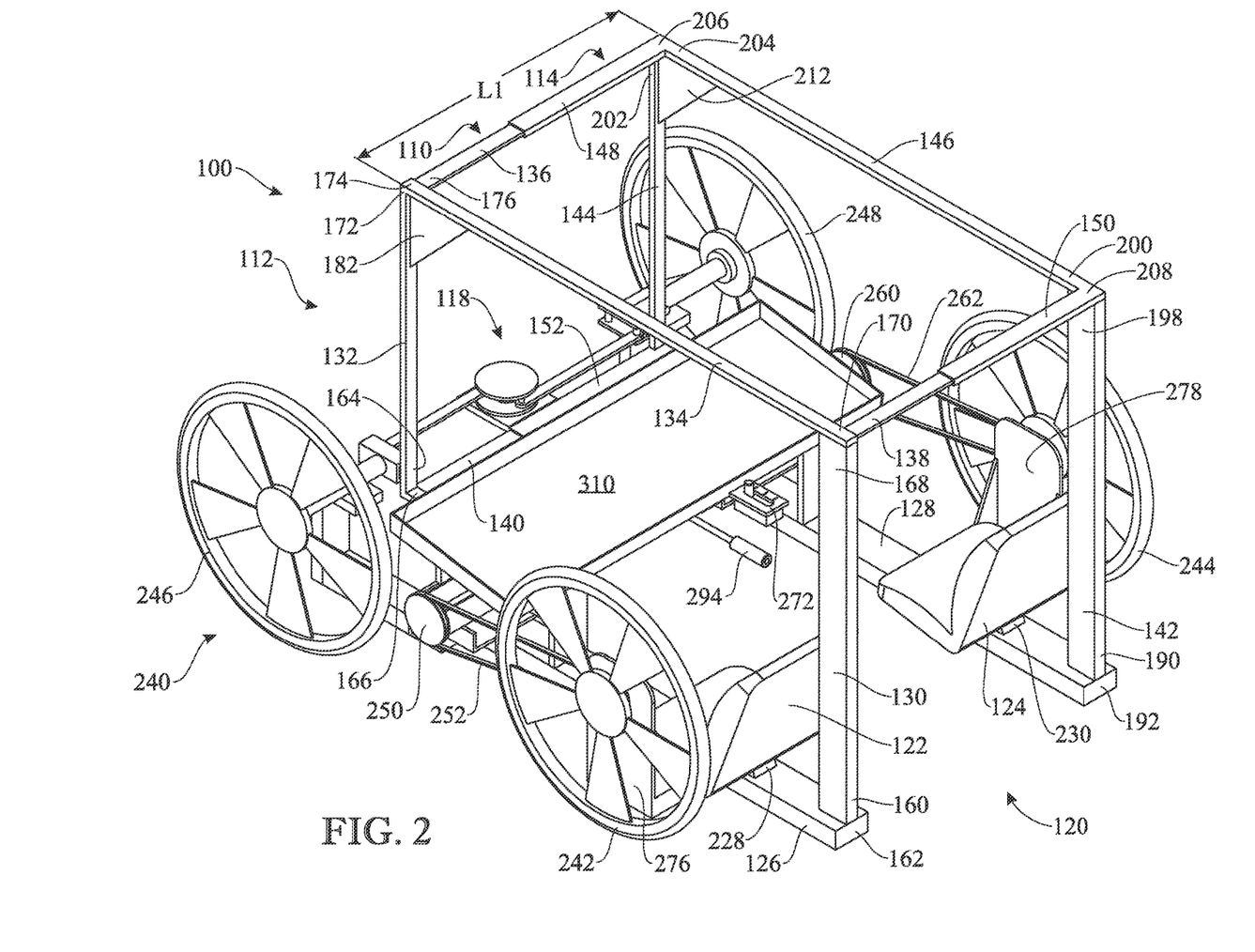
FIG. 2 presents a top rear isometric view of the seated strawberry harvesting machine illustrated in FIG. 1 with a windshield and canopy removed.

Referring initially to FIGS. 1-7, and initially with regard to FIGS. 1 and 2, a width adjustable seated strawberry harvesting machine, hereinafter harvesting machine 100, is illustrated in accordance with an exemplary embodiment of the present invention.

The harvesting machine 100 generally includes a width-adjustable chassis or frame 110 having a first or left frame half 112 and a second or right frame half 114 movably mounted to the left frame half 112. A propulsion system 116 is provided on the frame 110 to propel the harvesting machine 100 down a row of strawberries, or rows of other ground growing fruits or vegetables. A steering mechanism 118 is connected to the frame 110, and is operably connected to the propulsion system 116 to guide the harvesting machine 100 as it travels down the rows of strawberries and to turn the harvesting machine 100 around at the end of the rows of strawberries for another pass down a next adjacent row.

The harvesting machine 100 is designed to allow a pair of strawberry pickers (not shown) to pick strawberries out of a row of strawberries passing between them. Thus, the harvesting machine 100 includes a pair of spaced apart seats 120 supported on the adjustable frame 110. The pair of spaced apart seats 120 includes a first or left-side seat 122 and a second or right-side seat 124. The left-side seat 122 is mounted on a lower left longitudinal member 126 of the left frame half 112 and the right-side seat 124 is mounted on a lower right longitudinal member 128 of the right frame half 114. As noted hereinabove, the frame 100 is width-adjustable such that the left frame half 112 and the right frame half 114 can be moved closer to each other or farther away from each other, thus changing the width or spacing between the right-side seat 122 and the left-side seat 124, accordingly. In some embodiments, the adjustable frame width may be adjusted to accommodate a width of a first row of strawberries so a first picker seated in the first seat and a second picker seated in the second seat may use the harvesting machine to pick strawberries from the first row of strawberries passing between said first picker and said second picker. In other embodiments, the adjustable frame width may be adjusted to accommodate a row spacing between a first row of strawberries and a second row of strawberries, so a first picker seated in the first seat may pick strawberries from the first row of strawberries and a second picker seated in the second seat may pick strawberries from the second row of strawberries as the harvesting machine passes between the first row of strawberries and the second row of strawberries.

In addition to the lower left longitudinal member 126 noted hereinabove, the left frame half 112 generally includes a rear left vertical member 130 extending upwardly from the lower left longitudinal member 126 and a front left vertical member 132 also extending upwardly from the lower left longitudinal member 126 (best seen at FIGS. 1 and 2). An upper left longitudinal member 134 extends between the rear left vertical member 130 and the front left vertical member 132. In order to adjustably secure the left frame half 112 to the right frame half 114, the left frame half 112 further includes a front left upper cross-member 136, a rear left upper cross-member 138 and a front left lower cross-member 140.

Likewise, in addition to the lower right longitudinal member 128, the right frame half 114 generally includes a rear right vertical member 142 extending upwardly from the lower right longitudinal member 128 and a front right vertical member 144 also extending upwardly from the lower right longitudinal member 128 (best seen at FIGS. 1 and 2). An upper right longitudinal member 146 extends between the rear and front right vertical members 142 and 144, respectively. The right frame half 114 further includes a front right upper cross-member 148, a rear right upper cross-member 150 and a front right lower cross-member 152. The front right upper cross-member 148, the rear right cross-member 150 and the front right lower cross-member 152 of the right frame half 114 slidingly or adjustably engage the front left upper cross-member 136, the rear left upper cross-member 138 and the front left lower cross-member 140 of the left frame half 112, respectively, to allow the frame 110 of the harvesting machine 100 to be adjusted in width to suit the conditions as described in more detail hereinbelow.

The frame 110 may be formed from a variety of materials including, but not limited to, wood, steel or iron, various plastics and polymers, etc. The components of the frame 110 may be assembled in a variety of ways including welding, nailing, bolting or screwing the components together, and the like. In preferred embodiment, the frame 110 is formed from lengths of steel angle iron, being right angular in cross-section, and including a plurality of mounting holes along the lengths thereof to permit the components of the frame to be bolted together at various locations. The use of lengths of steel angle iron with mounting holds permits easy adjustment of the width of the frame 100 by varying the connection points between the front left upper cross-member 136, the rear left upper cross-member 138 and the front left lower cross-member 140 of the left frame half 112 with the front right upper cross-member 148, the rear right upper cross-member 150 and the front right lower cross-member 152 of the right frame half 114, respectively.

In more detail, a bottom end 160 of the rear left vertical member 130 is affixed to a rear end 162 of the lower left longitudinal member 126 and a bottom end 164 of the front left vertical member 132 is affixed to a front end 166 of the lower left longitudinal member 126. Likewise, a top end 168 of the rear left vertical member 130 is affixed to a rear end 170 of the upper left longitudinal member 134 and a top end 172 of the front left vertical member 132 is affixed to a front end 174 of the upper left longitudinal member 134 to form a rectangle in the left frame half 112. A first end 176 of the front left upper cross-member 136 and a first end 178 of the rear left upper cross-member 138 extend transversely from the front and rear ends 174 and 170, respectively, of the upper left longitudinal member 134 and a first end 180 of the front left lower cross-member 140 (best seen at FIG. 4) extends transversely from the front end 166 of the lower left longitudinal member 126. Finally, a left stiffening plate 182 (as best shown if FIG. 2) is affixed to the front left vertical member 132 and the upper left longitudinal member 134 at their top and front ends 172 and 174, respectively to strengthen the rectangle formed by the lower left longitudinal member 126, the rear and front left vertical members 130 and 132, respectively, and the upper left longitudinal member 134.

Likewise, with regard to the right frame half 114 of the frame 110 of the harvesting machine 100, a bottom end 190 of the rear right vertical member 142 is affixed to a rear end 192 of the lower right longitudinal member 128 and a bottom end 194 of the front right vertical member 144 is affixed to a front end 196 of the lower right longitudinal member 128. Likewise, a top end 198 of the rear right vertical member 142 is affixed to a rear end 200 of the upper right longitudinal member 146 and a top end 202 of the front right vertical member 144 is affixed to a front end 204 of the upper right longitudinal member 146 to form a rectangle in the right frame half 114. A first end 206 of the front right upper cross-member 148 and a first end 208 of the rear right upper cross-member 150 extend transversely from the front and rear ends 204 and 200, respectively, of the upper right longitudinal member 146 and a first end 210 of the front right lower cross-member 152 extends transversely from the front end 196 of the lower right longitudinal member 128 (best seen at FIG. 4). Finally, a right stiffening plate 212 (as best shown at FIG. 2) is affixed to the front right vertical member 144 and the upper right longitudinal member 146 at their respective top and front ends 202 and 204, to strengthen the rectangle formed by the lower right longitudinal member 128, the rear and front right vertical members 142 and 144, respectively, and the upper right longitudinal member 146.

Figure 3:
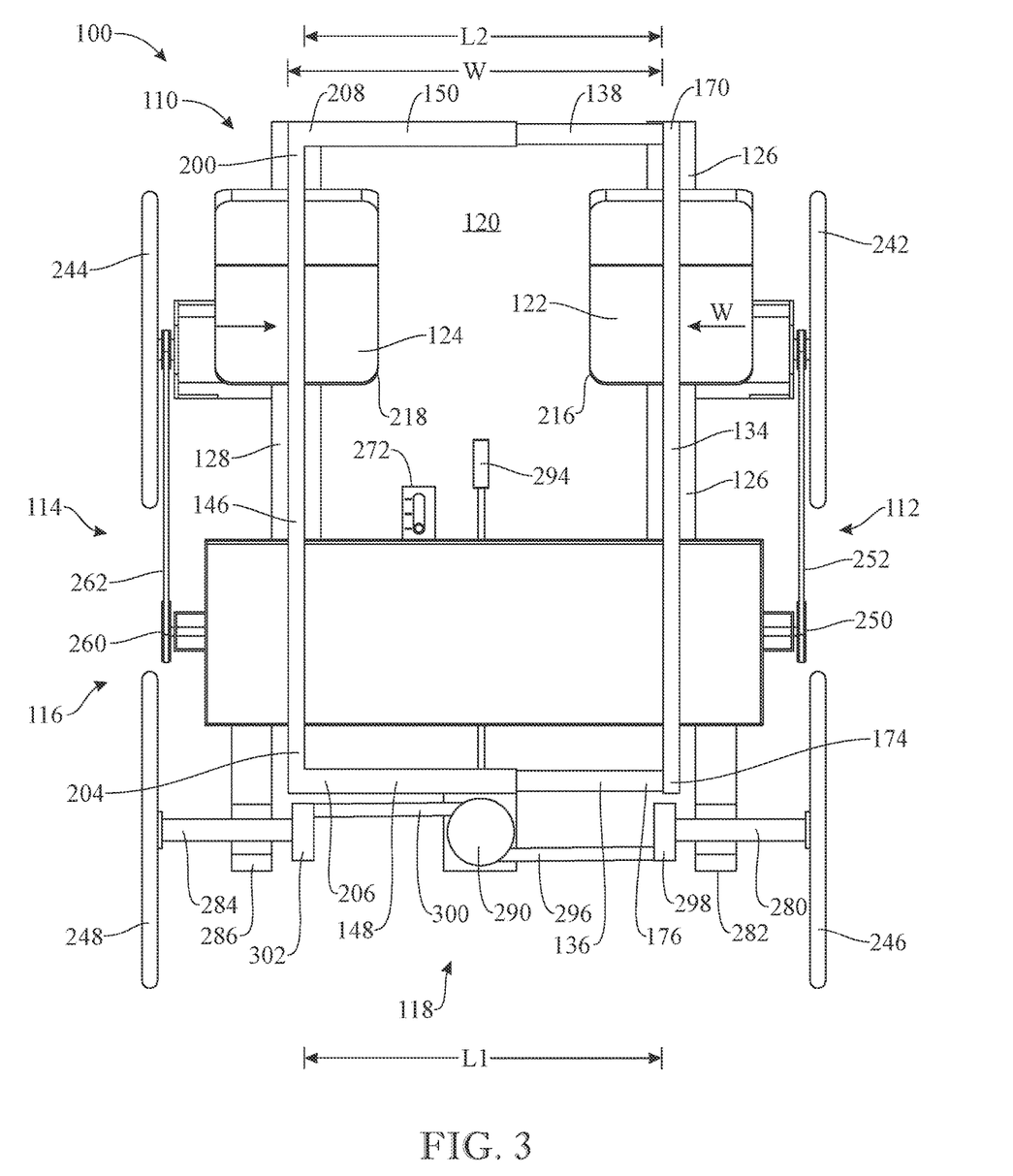
FIG. 3 is a top plan view of the seated strawberry harvesting machine of FIG. 2.

In order to adjust the width of the frame 100, by moving the left frame half 112 relative to the right frame half 114, the front left upper cross-member 136 is slid or otherwise adjusted relative to the front right upper cross-member 148 to lengthen or shorten their combined length L1 (shown at FIG. 2) to widen or narrow the overall width "W" of the frame 110 of the harvesting machine 100 (shown at FIG. 3). It should be noted that the rear left upper cross-member 138 and the rear right upper cross member 150 (shown at FIG. 3) are adjusted likewise to lengthen or shorten their combined lengths to "L2" and likewise the front left lower cross-member 140 and front right lower cross-member 152 (shown at FIG. 4) are also adjusted to a combined length of "L3". Ideally, the combined lengths L1, L2 and L3 are substantially equal or identical.

Once the respective cross-members have been slid together to the desired width "W" of the frame 110 of the harvesting machine 100, the cross-members are secured together with bolts or other releasable fasteners. The adjustment of the disclosed cross-members relative to each other not only adjusts the width "W" of the frame but also, and as importantly, adjusts the distance "d" between the pair of spaced apart seats 120 to allow pickers situated in the left-side and right-side seats 122 and 124, respectively, to have easy access to the row of fruit passing between them. This adjustable width frame 100 prevents the pickers from having to reach out too far if the row is narrow or miss some fruit passing beneath the seats if the row being picked was wider than the seat spacing "d". Specifically, the distance "d" is the spacing or clearance between an inside edge 216 of the left-side seat 122 and an inside edge 218 of the right-side seat 124.

As noted hereinabove the left-side and right-side seats 122 and 124, respectively, of the pair of seats 120 are mounted on the parallel and spaced apart lower left and right longitudinal members 126 and 128 of the left and right frame halves 112 and 114, respectively. The seats are preferably fully backed having ergonomically formed seat cushions and cushioned seat backs. For example, the left-side seat 122 has a left padded seat cushion 220 and a left cushioned, upright seatback 222. Likewise, the right-side seat 124 also has a right padded seat cushion 224 and a right cushioned, upright seatback 226. The left-side and right-side seats 122 and 124 may also have a lumbar support for the comfort of the pickers.

The left-side and right-side seats 122 and 124 are mounted to the lower left and right longitudinal members 126 and 128 by respective brackets, the left bracket 228 and the right bracket 230 (see FIG. 2). While not specifically shown, in a preferred embodiment, the left-side seat 122 and the right-side seat 124 are fully adjustable on the brackets 228,230. The left-side seat 122 and the right-side seat 124, respectively, are adjustable for height relative to the lower left longitudinal member 126 and the lower right longitudinal member 128. The left-side seat 122 and the right-side seat 124 may also be rotatable on the left bracket 228 and the right bracket 230, respectively, and may be angled relative to the lower left and right longitudinal members 126,128 so as to angle the seats at a comfortable angle for the pickers (see FIGS. 2 and 7). By adjusting the seats, muscle pulls and other soft tissue stress injuries are avoided.

Further, either the left and right brackets 228,230 or the left-side and right-side seats 122,124 on the left and right brackets 228,230 may be longitudinally movable along their respective lower left and right longitudinal members 126, 128 so as to position one of the left-side and the right-side seats 122,124 in advance of the other. This allows the picker seated in the rearward seat to catch strawberries missed by the picker in the advanced or forward seat as the seated strawberry harvesting machine 100 passes over a row of strawberries.

Figure 4:
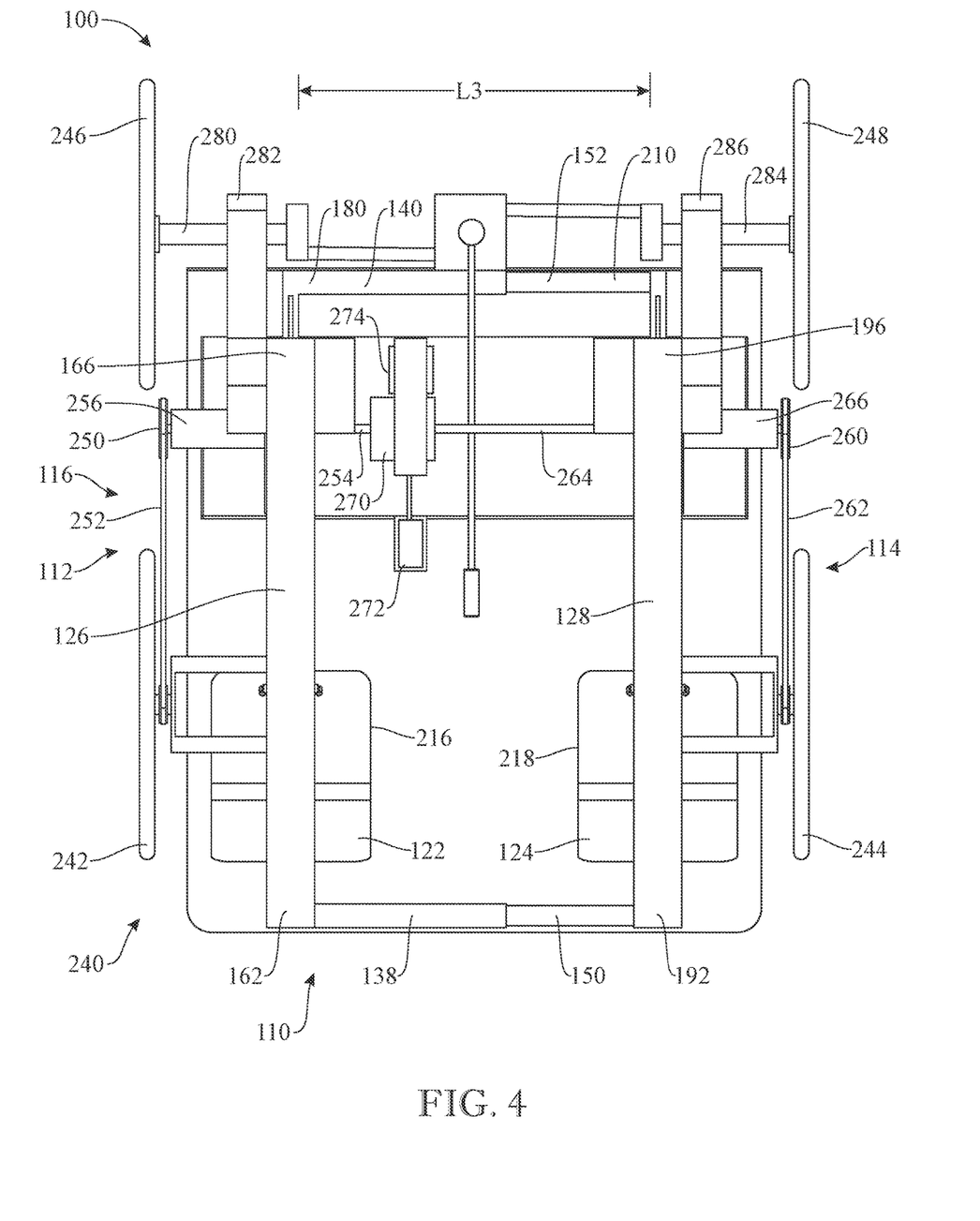
FIG. 4 presents a bottom plan view of the seated strawberry harvesting machine of FIG. 1.

As noted hereinabove, the seated strawberry harvesting machine 100 is self-propelled including the propulsion system 116. The propulsion system 116 generally includes a left-side drive wheel 240, a right-side drive wheel 242, a left-side guide wheel 244 and a right side guide wheel 246 which move the harvesting machine 100 down a row of strawberries and guide the harvesting machine 100 around turns at the ends of the rows of strawberries. As best shown in FIG. 4, the propulsion system 116 includes a left rotatable pulley 250 connected to the left-side drive wheel 242 by a left drive belt 252. A left rotatable drive shaft 254 is connected to the rotatable pulley 250 to rotate the pulley 250 and thus the left-side drive wheel 242 through the drive belt 252. The left rotatable drive shaft 254 is rotatably mounted on the left-side frame 112, and in this embodiment on the lower left longitudinal member 126, by a left journal or mounting bracket 256.

Similarly, the propulsion system 116 includes a right rotatable pulley 260 connected to the right-side drive wheel 244 by a right drive belt 262. A right rotatable drive shaft 264 is connected to the right rotatable pulley 260 to rotate the right rotatable pulley 260 and thus the right-side drive wheel 244 through the right drive belt 262. The right drive shaft 264 is rotatably mounted on the right-side frame 114, and in this embodiment the lower right longitudinal member 128, by a right journal or mounting bracket 266.

The drive shafts 254 and 264 may be rotated by various means to rotate the left-side and right-side drive wheels 242 and 244 in order to move the harvesting machine 100. For example, the drive shafts 254 and 264 may be connected to a pedal system associated with either or both the left-side and right-side seats 122 and 124 and which allows one or both pickers thereon to pedal and propel the harvesting machine 100 as desired.

Figure 5:
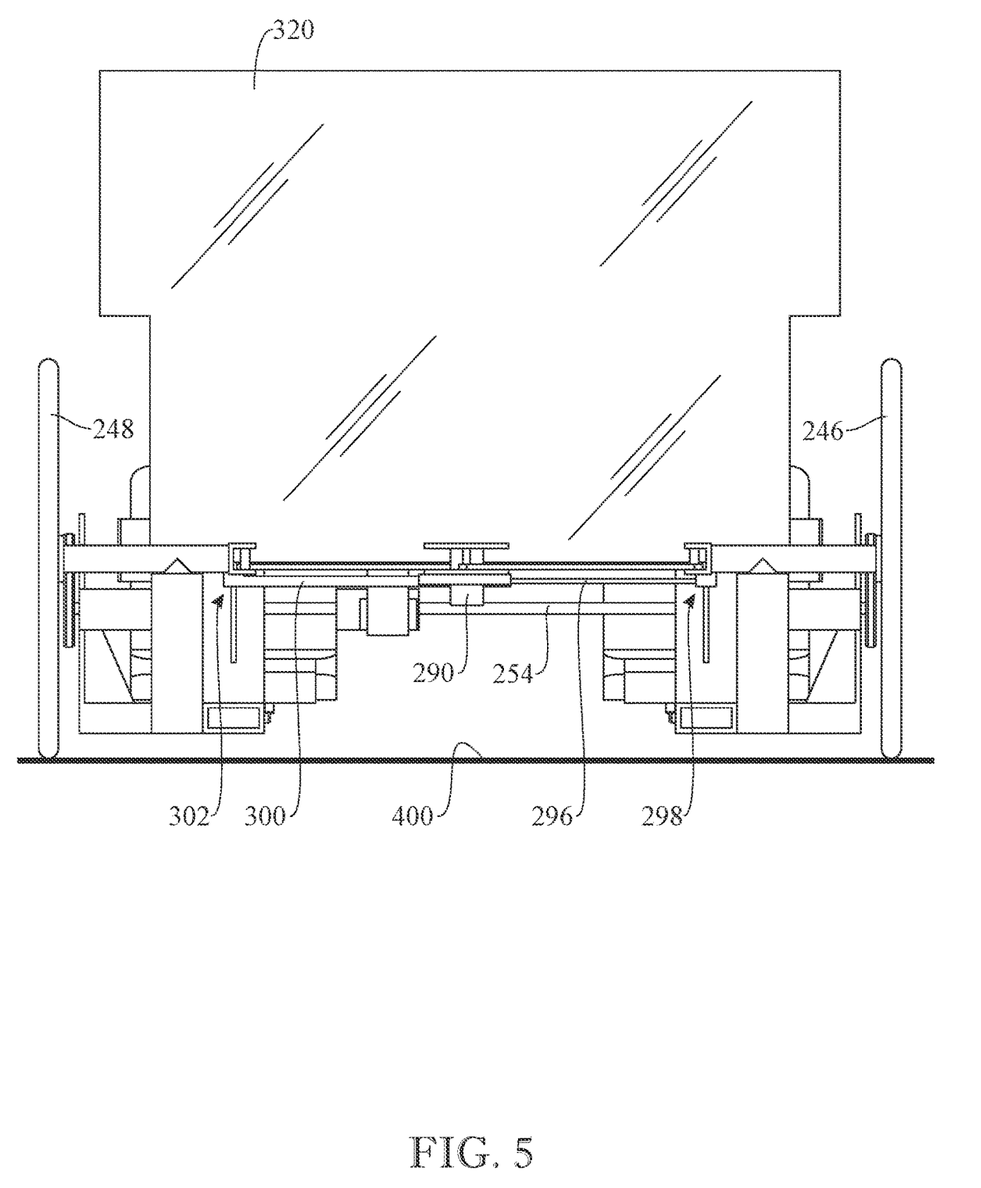
FIG. 5 presents a front elevation view of the seated strawberry harvesting machine of FIG. 1.

As best shown in FIGS. 4 and 5, in the disclosed embodiment, the left and right drive shafts 254,264 are rotated by a motor 270 mounted on the frame 110. A motor control 272 is provided to control the speed and direction of rotation of the motor 270. The motor 270 may be a gas or electric motor and in the disclosed embodiment is an electric motor 270 having a battery 274. The battery 274 is preferably rechargeable. This allows the harvesting machine 100 to run relatively silently thereby reducing fatigue on the pickers due to the noise of a gas powered motor.

The left-side and right-side drive wheels 242 and 244 are rotatably mounted to the lower left and right longitudinal members 126,128 by respective left-side and right-side wheel journals or brackets 276,278. In a preferred embodiment, the left-side and right-side drive wheels 242, 244 are height-adjustable in the respective brackets 276,278 to adjust the height of the harvesting machine 100 and, in particular, the height of the left-side and right-side seats 122,124 relative to the ground. This allows the harvesting machine 100 to be positioned at a comfortable height for the pickers relative to the fruit to be picked.

As noted hereinabove, the propulsion system 116 additionally includes the left-side and right-side guide wheels 246,248. With continued reference to FIGS. 3-5, the left-side guide wheel 246 is attached to a left rotatable shaft 280 which in turn is rotatably mounted through a left-side frame extension 282. The left-side frame extension 282 extends forward from the front end 166 of the lower left longitudinal member 126 of the left-side frame 112. Similarly, the right-side guide wheel 248 is attached to a right rotatable shaft 284 which in turn is rotatably mounted through a right-side frame extension 286 which extends forward from the front end of the right-side longitudinal member 128 (also referred to as "lower right longitudinal member") of the right-side frame 114.

The harvesting machine 100 includes the steering system 118 which is provided to turn the left-side and right-side guide wheels 246 and 248, respectively, relative to the frame 110. Turning specifically to FIGS. 3 and 5, the steering system 118 generally includes a rotatable turning wheel 290 mounted to the frame 110 or, in the disclosed embodiment, the front right lower cross-member 152. The rotatable turning wheel 290 is provided to turn the left-side and right-side guide wheels 246 and 248 relative to the frame 110 and includes a steering handle 294 connected to the rotatable turning wheel 290 and operable by the pickers. The rotatable turning wheel 290 is connected to the left-side guide wheel 246 through a left-side connecting arm 296 attached to a first mechanism 298 associated with the left-side guide wheel 246. Likewise, the rotatable tuning wheel 290 is connected to the right-side guide wheel 248 through a right-side connecting arm 300 attached to a second mechanism 302 associated with the right-side guide wheel 248. The first and second mechanisms 298,302 are of the type known in the art for angling a wheel mounted on a shaft. Movement of the steering handle 294 by the pickers turns the left-side and right-side guide wheels 246,248 in the desired direction.

Figure 6:
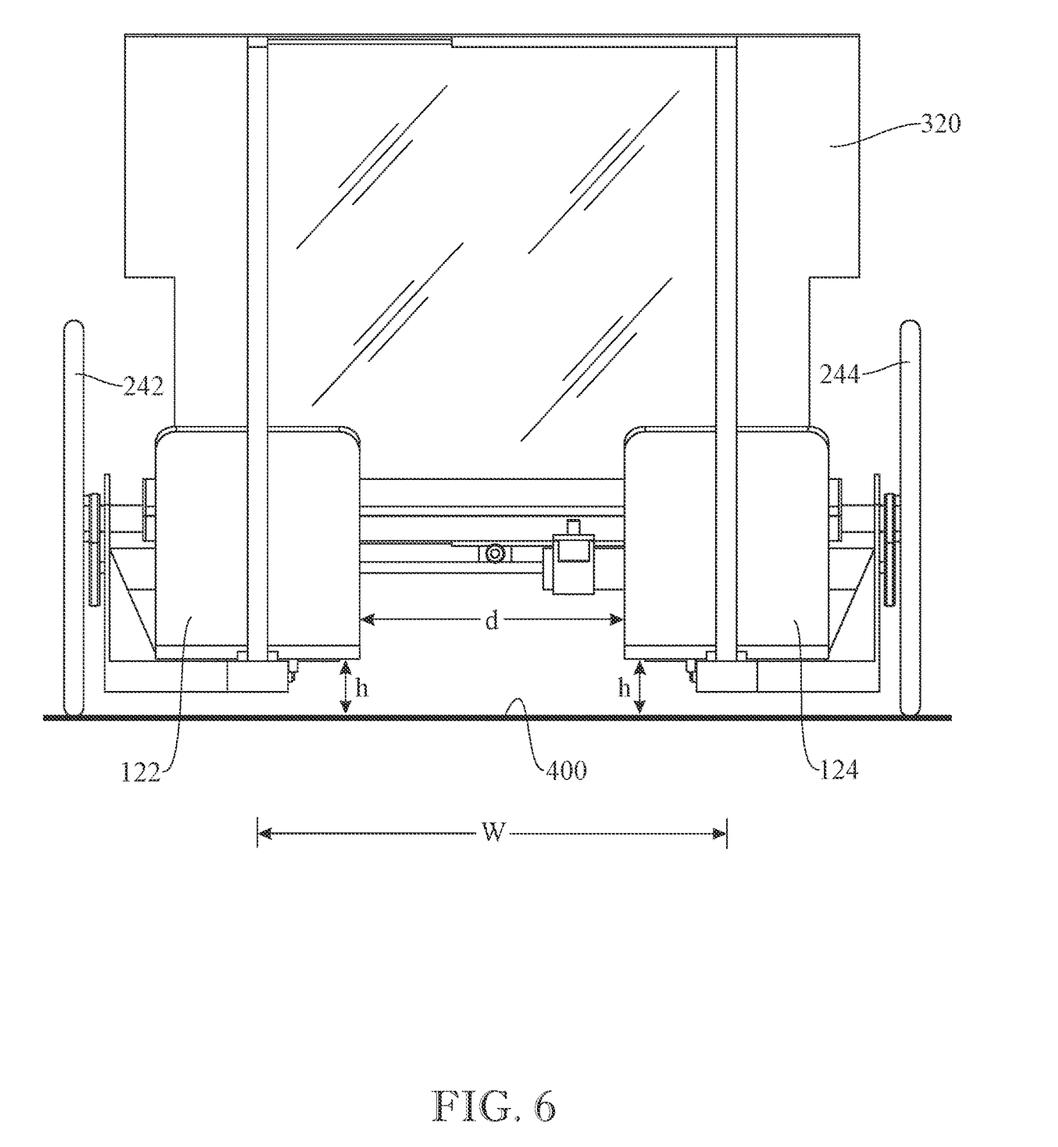
FIG. 6 presents a rear elevation view of the seated strawberry harvesting machine of FIG. 1.
Figure 7:
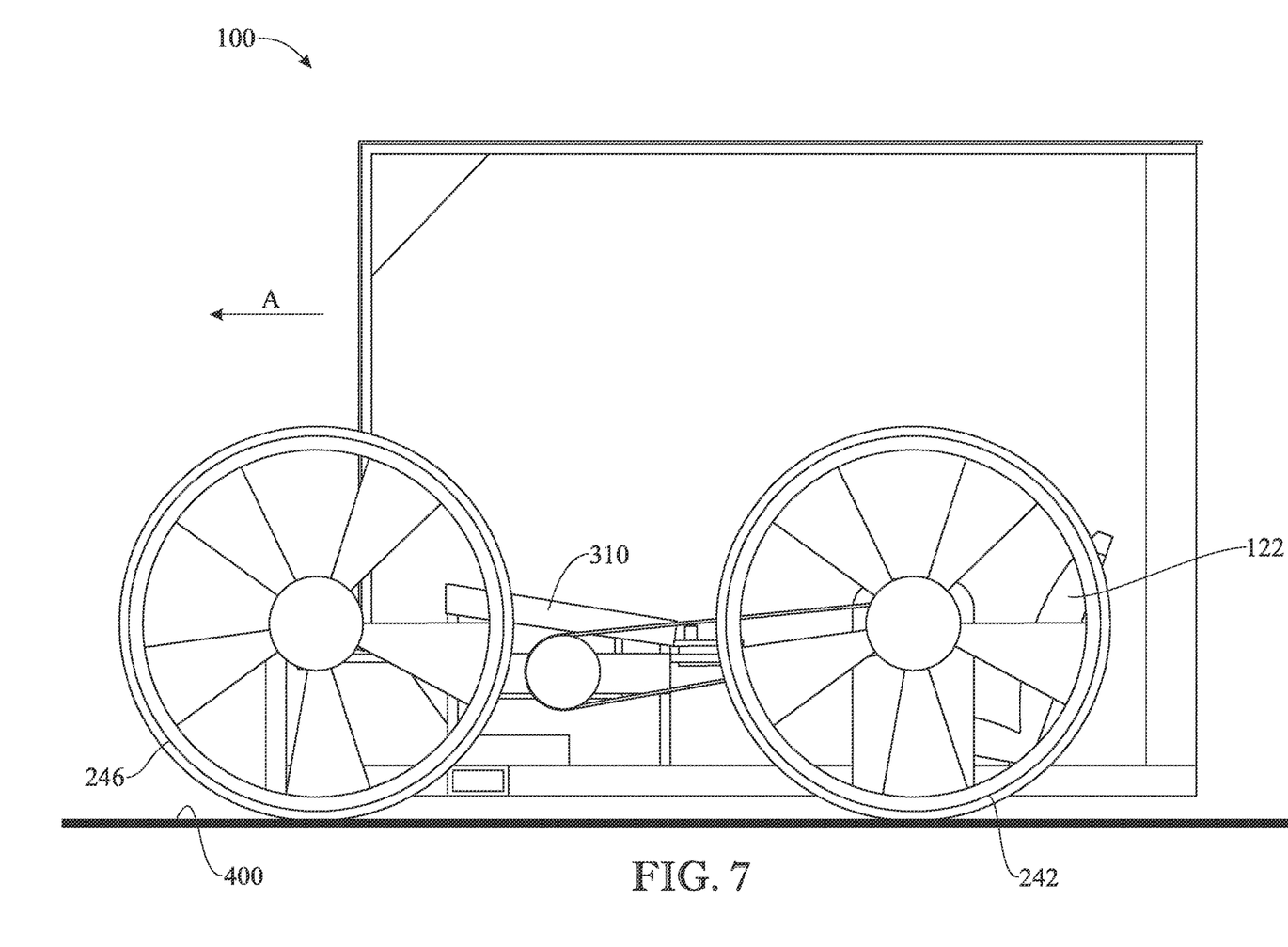
FIG. 7 presents a side elevation view of the strawberry harvesting machine illustrated in FIG. 1, shown from the left, in preparation for use.

Referring now to FIGS. 1, 2 and 6-8, and initially with regard to FIG. 6, in use, the pickers adjust the width "W" of the frame 100 to properly space the left-side and right-side seats 122 and 124, respectively, apart the desired distance "d". As noted hereinabove, the distance "d" is chosen based on the width of the row of strawberries to be picked. Additionally, the plurality of wheels 240 and, in particular the left-side and right-side drive wheels 242 and 244 may be adjusted to position the left-side and right-side seats 122 and 124 a desired height "h" above the ground 400 (See also FIG. 7). The left-side and right-side seats 122 and 124 may be angled to a desired orientation as best shown in FIG. 7.

Referring back for the moment to FIG. 1, in order to further provide comfort for the pickers seated in the harvesting machine 100, the harvesting machine 100 may additionally include an angled tray 310 to hold baskets of berries or just the berries themselves if later sorting on the angled tray 310 is desired. Additionally, to protect the pickers and allow the harvesting machine 100 to be comfortably used in inclement weather, the harvesting machine 100 includes a windshield 320 affixed to one of the front left or the front right vertical members 132 or 144 of the frame 110. Further a roof 322 may be provided over the pickers and affixed to one of the upper left or upper right longitudinal members 134 or 146. Alternatively, the roof 322 may be affixed to the upper cross-bars of one side of the frame 110. It should be noted that the windshield 320 and the roof 322 are affixed to frame members on only one side of the frame 110 to allow the left-side frame 112 and the right-side frame 114 to be adjusted relative to each other as described hereinabove.

Figure 8:
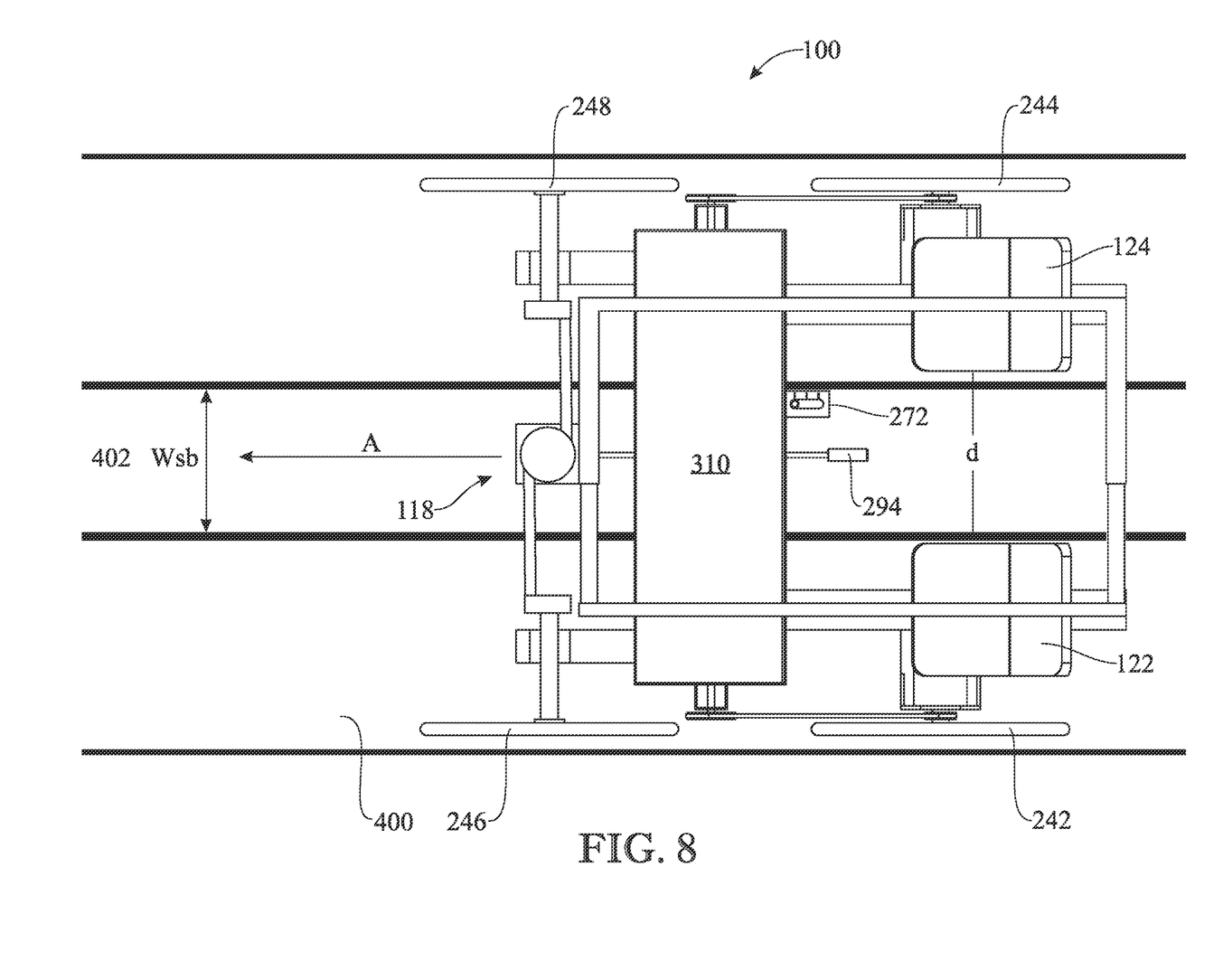
FIG. 8 is a top plan view of the seated strawberry harvesting machine of FIG. 1 moving along a row of berries to be picked.

Referring now to FIG. 8, the harvest machine 100 is adjusted to accommodate the width Wsb of a row of strawberries by adjusting the frame 110 to a width W that places the left-side and right-side seats 122 and 124 the correct distance "d" apart. Thereafter, the pickers use the motor control 272 to propel the harvesting machine 100 down the row of strawberries 402 to be picked. Minor corrections in the direction of motion, as shown at FIG. 7 and FIG. 8 as the direction of arrow "A", may be made utilizing the steering handle 294. Once the end of a row of strawberries (not shown) has been reached, the steering handle 294 alone or in conjunction with the motor control 272 may be used to turn the harvesting machine 100 around for another pass down another row of strawberries.

Thus, the disclosed harvesting machine 100 provides an easy and comfortable device to allow a pair of strawberry pickers to pick a row of strawberries without excessive bending or carrying or other motions which tend to cause soft tissue injuries or stresses.

In summary, the present invention provides a self-propelled, width-adjustable, seated harvesting machine for use in picking ground-growing produce from at least one row of ground-growing produce. In an exemplary embodiment, the harvesting machine comprises: a width-adjustable frame having a first frame half, and a second frame half mounted for horizontal movement relative to said first frame half to provide an adjustable frame width; a first seat mounted to said first frame half and a second seat mounted to said second frame half, said first seat and said second seat being separated by an adjustable seat distance; a propulsion system for propelling the harvesting machine on the ground, the propulsion system being affixed to said frame and including a plurality of wheels; and a steering mechanism connected to said frame and operably connected to said propulsion system and said plurality of wheels, for turning the frame relative to the ground. The first frame half is horizontally movable relative to the second frame half, to adjust the adjustable frame width from a first frame width to a second frame width, and to adjust the adjustable seat distance from a first seat distance to a second seat distance.

In some embodiments, the adjustable frame width may be adjusted to accommodate a width of a first row of strawberries so a first picker seated in the first seat and a second picker seated in the second seat may use the harvesting machine to pick strawberries from the first row of strawberries passing between said first picker and said second picker. In other embodiments, the adjustable frame width may be adjusted to accommodate a row spacing between a first row of strawberries and a second row of strawberries, so a first picker seated in the first seat may pick strawberries from the first row of strawberries and a second picker seated in the second seat may pick strawberries from the second row of strawberries as the harvesting machine passes between the first row of strawberries and the second row of strawberries.

In an exemplary embodiment, the first frame half comprises a left frame half, the second frame half comprises a right frame half; the plurality of wheels is constructed and arranged to move the harvesting machine down the at least one row of ground-growing produce; the plurality of wheels comprises a left-side drive wheel, a right-side drive wheel, a left-side guide wheel, and a right-side guide wheel; and a propulsion system. The propulsion system further comprises: a left rotatable pulley connected to the left-side drive wheel by a left drive belt; a left rotatable drive shaft rotatably mounted on the left frame half, the left rotatable drive shaft being operably connected to the left rotatable pulley, the left rotatable drive shaft being configured to rotate the left rotatable pulley, and cause the left drive belt and the left-side drive wheel to rotate in response to rotation of the left rotatable pulley; a right rotatable pulley connected to the right-side drive wheel by a right drive belt; and a right rotatable drive shaft rotatably mounted on the right frame half, the right rotatable drive shaft being operably connected to the right rotatable pulley, the right rotatable drive shaft being configured to rotate the right rotatable pulley, and cause the right drive belt and the right-side drive wheel to rotate in response to the rotation of the right rotatable pulley.

The left rotatable drive shaft is rotatably mounted on a lower left longitudinal member of the left frame half, by a left mounting bracket; and the right rotatable drive shaft is rotatably mounted on a lower right longitudinal member of the right frame half, by a right mounting bracket. The left rotatable drive shaft and the right rotatable drive shaft are operably connected to a pedal system. In some embodiments, the pedal system is associated with the left-side seat, and is constructed and arranged to allow a picker seated in the left-side seat to pedal and propel the harvesting machine. In other embodiments, the pedal system is associated with the right-side seat and is constructed and arranged to allow a picker seated in the right-side seat to pedal and propel the harvesting machine.

The left rotatable drive shaft and the right rotatable drive shaft are operably connected to a motor for rotation thereby, the motor being mounted on the width-adjustable frame. In some embodiments, the motor is a gas motor. In other embodiments, the motor is an electric motor. The electric motor may further comprise a battery. The battery may be a rechargeable battery. The motor is associated with a motor control configured to control the speed and direction of rotation of the motor.

The left-side drive wheel is height-adjustable in the left-side mounting bracket, and the right-side drive wheel is height-adjustable in the right-side mounting bracket, to provide an adjustable height of the harvesting machine relative to the ground, and to provide an adjustable height of the left-side seat and the right-side seat relative to the ground, thereby permitting the harvesting machine to be positioned at a comfortable height for the pickers relative to the ground-growing fruit to be picked and harvested.

In an exemplary embodiment, the width-adjustable frame may further comprise a left-side frame extension extending forward from a front end of the lower left longitudinal member of the left frame half, and a right-side frame extension extending forward from a front end of the right-side longitudinal member of the right frame half; the left-side guide wheel may be attached to the left rotatable drive shaft, which is rotatably mounted through the left-side frame extension; and the right-side guide wheel may be attached to the right rotatable drive shaft, which is rotatably mounted through the right-side frame extension.

In an exemplary embodiment, the steering mechanism is configured to turn the left-side guide wheel and the right-side guide wheel relative to the width-adjustable frame. The steering mechanism comprises a rotatable turning wheel mounted to the width-adjustable frame, and a steering handle connected to the rotatable turning wheel, the steering handle being operable by a picker to steer the self-propelled, width-adjustable, seated harvesting machine. The rotatable turning wheel is mounted to the width-adjustable frame at a front right lower cross-member of the width-adjustable frame. The rotatable turning wheel is connected to the left-side guide wheel through a left-side connecting arm attached to a first mechanism operably connected to the left-side guide wheel, the first mechanism being capable of angling the left-side guide wheel in response to movement of the steering handle; and the rotatable tuning wheel is connected to the right-side guide wheel through a right-side connecting arm attached to a second mechanism operably connected to the right-side guide wheel, the second mechanism being capable of angling the right-side guide wheel in response to movement of the steering handle; whereby a picker operating the steering handle may move the steering handle to turn the left-side guide wheel and the right-side guide wheel in a desired direction to steer the self-propelled, width-adjustable, seated harvesting machine around turns at the ends of the rows of ground-growing produce.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A self-propelled, width-adjustable, seated harvesting machine for use in picking ground-growing produce from at least one row of ground-growing produce, the harvesting machine comprising:
    a width-adjustable frame having a first frame half, and a second frame half mounted for horizontal movement relative to said first frame half to provide an adjustable frame width;
    a first seat mounted to said first frame half and a second seat mounted to said second frame half, said first seat and said second seat being separated by an adjustable seat distance;
    a propulsion system for propelling the harvesting machine on the ground, the propulsion system being affixed to said frame and including a plurality of wheels; and
    a steering mechanism connected to said frame and operably connected to said propulsion system and said plurality of wheels, for turning the frame relative to the ground, wherein the first frame half is horizontally movable relative to the second frame half, to adjust the adjustable frame width from a first frame width to a second frame width, and to adjust the adjustable seat distance from a first seat distance to a second seat distance;

wherein:
    the first frame half comprises a left frame half;
    the second frame half comprises a right frame half;
    the plurality of wheels is constructed and arranged to move the harvesting machine down the at least one row of ground-growing produce;
    the plurality of wheels comprises a left-side drive wheel, a right-side drive wheel, a left-side guide wheel, and a right-side guide wheel; and
    the propulsion system further comprises:
        a left rotatable pulley connected to the left-side drive wheel by a left drive belt;
        a left rotatable drive shaft rotatably mounted on the left frame half, the left rotatable drive shaft being operably connected to the left rotatable pulley, the left rotatable drive shaft being configured to rotate the left rotatable pulley, and cause the left drive belt and the left-side drive wheel to rotate in response to rotation of the left rotatable pulley;
a right rotatable pulley connected to the right-side drive wheel by a right drive belt; and
a right rotatable drive shaft rotatably mounted on the right frame half, the right rotatable drive shaft being operably connected to the right rotatable pulley, the right rotatable drive shaft being configured to rotate the right rotatable pulley, and cause the right drive belt and the right-side drive wheel to rotate in response to the rotation of the right rotatable pulley:
wherein the left rotatable drive shaft is rotatably mounted on a lower left longitudinal member of the left frame half, by a left mounting bracket; and
wherein the right rotatable drive shaft is rotatably mounted on a lower right longitudinal member of the right frame half, by a right mounting bracket;
wherein the left-side drive wheel is height-adjustable in the left-side mounting bracket, and the right-side drive wheel is height-adjustable in the right-side mounting bracket, to provide an adjustable height of the harvesting machine relative to the ground, and to provide an adjustable height of the left-side seat and the right-side seat relative to the ground, thereby permitting the harvesting machine to be positioned at a comfortable height for the pickers relative to the ground-growing fruit to be picked and harvested.

2. The self-propelled, width-adjustable, seated harvesting machine of claim 1, wherein the at least one row of ground-growing product comprises at least one row of strawberries, and the adjustable frame width is adjusted to accommodate a width of a first row of strawberries of said at least one row of strawberries, whereby a first picker seated in the first seat and a second picker seated in the second seat may use the harvesting machine to pick strawberries from the first row of strawberries passing between said first picker and said second picker.

3. The self-propelled, width-adjustable, seated harvesting machine of claim 1, wherein the at least one row of ground-growing product comprises a first row of strawberries and a second row of strawberries, and wherein the adjustable frame width is adjusted to accommodate a row spacing between the first row of strawberries and the second row of strawberries, whereby a first picker seated in the first seat may pick strawberries from the first row of strawberries and a second picker seated in the second seat may pick strawberries from the second row of strawberries as the harvesting machine passes between the first row of strawberries and the second row of strawberries.

4. The self-propelled, width-adjustable, seated harvesting machine of claim 1 wherein the left rotatable drive shaft and the right rotatable drive shaft are operably connected to a pedal system.

5. The self-propelled, width-adjustable, seated harvesting machine of claim 4 wherein the pedal system is associated with the left-side seat and is constructed and arranged to allow a picker seated in the left-side seat to pedal and propel the harvesting machine.

6. The self-propelled, width-adjustable, seated harvesting machine of claim 4 wherein the pedal system is associated with the right-side seat and is constructed and arranged to allow a picker seated in the right-side seat to pedal and propel the harvesting machine.

7. The self-propelled, width-adjustable, seated harvesting machine of claim 1 wherein the left rotatable drive shaft and the right rotatable drive shaft are operably connected to a motor for rotation thereby, the motor being mounted on the width-adjustable frame.

8. The self-propelled, width-adjustable, seated harvesting machine of claim 7 wherein the motor is a gas motor.

9. The self-propelled, width-adjustable, seated harvesting machine of claim 7 wherein the motor is an electric motor.

10. The self-propelled, width-adjustable, seated harvesting machine of claim 9 wherein the electric motor comprises a battery.

11. The self-propelled, width-adjustable, seated harvesting machine of claim 10 wherein the battery is rechargeable.

12. The self-propelled, width-adjustable, seated harvesting machine of claim 7 wherein the motor is associated with a motor control configured to control the speed and direction of rotation of the motor.

13. The self-propelled, width-adjustable, seated harvesting machine of claim 1, wherein:
the width-adjustable frame further comprises a left-side frame extension extending forward from a front end of the lower left longitudinal member of the left frame half, and a right-side frame extension extending forward from a front end of the right-side longitudinal member of the right frame half;
the left-side guide wheel is attached to the left rotatable drive shaft, which is rotatably mounted through the left-side frame extension; and
the right-side guide wheel is attached to the right rotatable drive shaft, which is rotatably mounted through the right-side frame extension.

14. The self-propelled, width-adjustable, seated harvesting machine of claim 1, wherein:
the steering mechanism is configured to turn the left-side guide wheel and the right-side guide wheel relative to the width-adjustable frame.

15. The self-propelled, width-adjustable, seated harvesting machine of claim 14, wherein the steering mechanism comprises a rotatable turning wheel mounted to the width-adjustable frame, and a steering handle connected to the rotatable turning wheel, the steering handle being operable by a picker to steer the self-propelled, width-adjustable, seated harvesting machine.

16. The self-propelled, width-adjustable, seated harvesting machine of claim 15, wherein the rotatable turning wheel is mounted to the width-adjustable frame at a front right lower cross-member of the width-adjustable frame.

17. The self-propelled, width-adjustable, seated harvesting machine of claim 16, wherein:
the rotatable turning wheel is connected to the left-side guide wheel through a left-side connecting arm attached to a first mechanism operably connected to the left-side guide wheel, the first mechanism being capable of angling the left-side guide wheel in response to movement of the steering handle; and
the rotatable tuning wheel is connected to the right-side guide wheel through a right-side connecting arm attached to a second mechanism operably connected to the right-side guide wheel, the second mechanism being capable of angling the right-side guide wheel in response to movement of the steering handle;
whereby a picker operating the steering handle may move the steering handle to turn the left-side guide wheel and the right-side guide wheel in a desired direction to steer the self-propelled, width-adjustable, seated harvesting machine around turns at the ends of the rows of ground-growing produce.

* * * * *